3,452,084
N-ALKYLATED ACYLAMINOTRIIODO-PHENYLALKANOIC ACIDS

James H. Ackerman, Bethlehem, N.Y., assignor to Sterling Drug Inc., New York, N.Y., a corporation of Delaware
No Drawing. Filed Oct. 13, 1965, Ser. No. 495,694
Int. Cl. C07c 103/14
U.S. Cl. 260—515        5 Claims

ABSTRACT OF THE DISCLOSURE 3-acylamino-2,4,6-triiodophenylalkanoic acids and 3,5-bis(acylamino)-2,4,6-triiodophenylalkanoic acids are treated with a lower-alkyl halide or sulfate to produce the corresponding N-alkylated or N,N'-dialkylated compounds. The latter are useful as cholecystographic agents.

---

This invention relates to new iodinated organic acids, and in particular is concerned with N-alkylated acylaminotriiodophenylalkanoic acids and with intermediates in the preparation thereof.

In one aspect of the invention the compounds are of the following general formula:

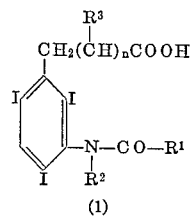

(1)

where $R^1$ is hydrogen or lower-alkyl, $R^2$ is lower-alkyl, $R^3$ is hydrogen, lower-alkyl or phenyl, and $n$ is 0 or 1.

The term "lower-alkyl" as used in defining $R^1$, $R^2$ and $R^3$ above, stands for an alkyl group of from one to six carbon atoms, thus including methyl, ethyl, propyl, isopropyl, butyl, pentyl, hexyl, and the like.

The compounds of Formula 1 are prepared by N-alkylation of compounds of the formula

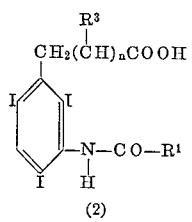

(2)

The N-alkylation is carried out by treating under alkaline conditions a compound of Formula 2 with a lower-alkyl halide or sulfate. The compounds of Formula 2 are in turn prepared by N-acylation of the corresponding 3-amino-2,4,6-triiodophenylalkanoic acids with the appropriate acid anhydride or acid halide.

In another aspect of the invention the compounds are of the following general formula

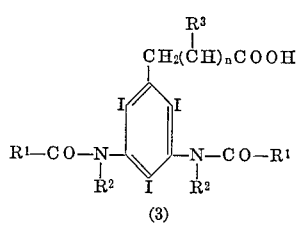

(3)

wherein $R^1$ is hydrogen or lower-alkyl, $R^2$ is lower-alkyl, $R^3$ is hydrogen, lower-alkyl or phenyl, and $n$ is 0 or 1. The term "lower-alkyl" has the same meaning as given above in connection with the compounds of Formula 1.

The compounds of Formula 3 where $n$ is 1 are prepared according to the reaction sequence of the following flow sheet:

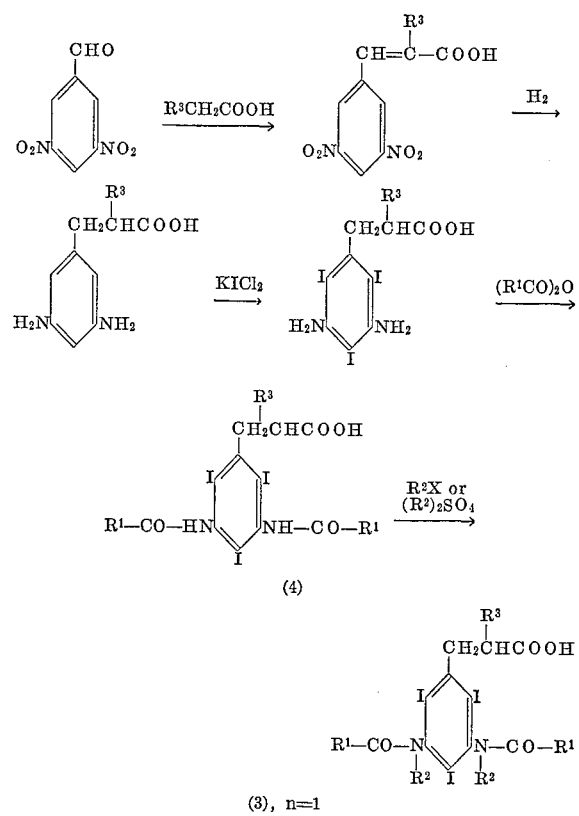

(3), n=1

3,5-dinitrobenzaldehyde is treated with an acid $R^3CH_2COOH$ under the conditions of the Perkin reaction to give 3,5-dinitro-α-$R^3$-cinnamic acid. The latter upon hydrogenation affords 3,5-diamino-α-$R^3$-hydrocinnamic acid which is iodinated with potassium iododichloride to give 3,5-diamino-2,4,6-triiodo-α-$R^3$-hydrocinnamic acid. The next step is N-acylation with an anhydride, $(R^1CO)_2O$, followed by N-alkylation of the resulting 3,5-diacylamino-2,4,6-triiodo-α-$R^3$-hydrocinnamic acid (4) with a lower-alkyl halide or sulfate.

The compounds of Formula 3 where $n$ is 0 are prepared according to the reaction sequence of the following flow sheet:

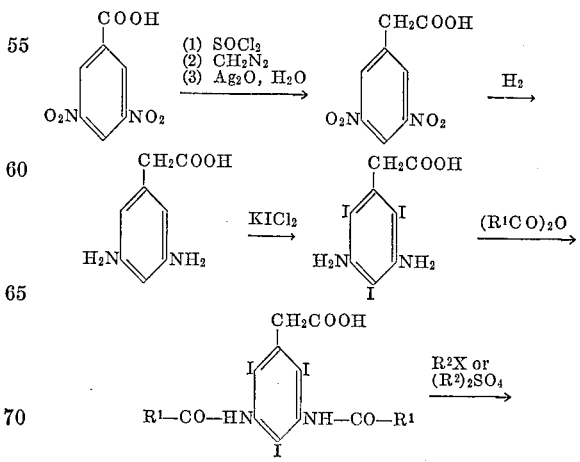

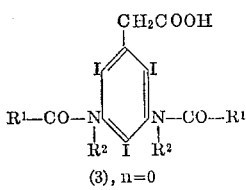

(3), n=0

3,5-dinitrobenzoic acid, when subjected to the Arndt-Eistert procedure (conversion to the acid chloride with thionyl chloride, treatment with diazomethane to prepare the diazoketone and decomposition of the latter with silver oxide) is converted to 3,5-dinitrophenylacetic acid. The latter is reduced to 3,5-diaminophenylacetic acid which is iodinated with potassium iododichloride to give 3,5-diamino-2,4,6-triiodophenylacetic acid. The next step is N-acylation with an anhydride, $(R^1CO)_2O$, followed by N-alkylation of the resulting 3,5-diacylamino-2,4,6-triiodophenylacetic acid with a lower-alkyl halide or sulfate.

The compounds of Formulas 1 and 3 are effective as cholecystographic agents when administered by the oral or intravenous route at dose levels (50–100 mg./kg.) non-toxic to the animal organism. The compounds can be administered orally either in the form of the free acid or in the form of a pharmaceutically-acceptable salt of said acid. The compounds can be administered intravenously in the form of aqueous solutions of one or more water-soluble, pharmaceutically acceptable salts. The free acid and salt forms of the compounds of the invention are considered the full equivalents of one another.

The compounds of Formulas 1 and 3 can be obtained in the form of water-soluble, pharmaceutically-acceptable salts by treating them with a molar equivalent amount of an alkali metal hydroxide, alkaline earth metal hydroxide or an organic amine. Examples of such salts include the sodium salt, potassium salt, magnesium salt, calcium salt, diethanolamine salt, N-methylglucamine salt, and the like.

The following examples will further illustrate the invention without the latter being limited thereby.

EXAMPLE 1

N-methyl-3-butyramido - 2,4,6 - triiodo - α - ethylhydrocinnamic acid [(1); $R^1$ is $CH_2CH_2CH_3$, $R^2$ is $CH_3$, $R^3$ is $CH_2CH_3$, $n$ is 1]

3-butyramido-2,4,6-triiodo-α-ethylhydrocinnamic acid (60 g.) was mixed with 100 ml. of water and enough ethanol was added to effect solution. The solution was cooled to 8° C., and with stirring 49.7 ml. of 2.01 N aqueous sodium hydroxide was added, followed by a solution of 12.6 g. (9.33 ml.) of dimethyl sulfate in 75 ml. of acetone added dropwise over a period of 45 minutes. The reaction mixture was stirred further while allowing the temperature to rise to room temperature over a period of three and one-half hours. The volatile solvents were removed on a steam bath and the remainder allowed to stand at room temperature overnight. The reaction mixture was extracted three times with ether, and the combined aqueous layers were filtered and acidified with dilute hydrochloric acid. The solid product was collected by filtration and recrystallized first from acetonitrile and then from isopropyl alcohol to give N-methyl - 3 - butyramido - 2,4,6 - triiodo-α-ethylhydrocinnamic acid, M.P. 174.2–178.2° C. (corr.).

A 21.8 g. sample of N-methyl-3-butyramido-2,4,6-triiodo-α-ethylhydrocinnamic acid was taken up in an ethanol solution containing 16.13 ml. of 2.06 N sodium hydroxide solution. The mixture was filtered and the filtrate concentrated in vacuo. The residue was dissolved in acetone, benzene was added and the solution concentrated in vacuo to dryness to give 19.86 g. of N-methyl-3-butyramido-2,4,6-triiodo-α-ethylhydrocinnamic acid in the form of its sodium salt, M.P. above 300° C.

By replacing the 3-butyramido-2,4,6-triiodo-α-ethylhydrocinnamic acid in the foregoing preparation by a molar equivalent amount of 3-formamido-2,4,6-triiodo-α-ethylhydrocinnamic acid, 2,4,6-triiodo-3-propionamido-hydrocinnamic acid or 3-acetamido-2,4,6-triiodo-α-butyl-hydrocinnamic acid there can be obtained, respectively, N - methyl - 3 - formamido-2,4,6-triiodo-α-ethylhydrocinnamic acid [(1); $R^1$ is H, $R^2$ is $CH_3$, $R^3$ is $CH_2CH_3$, $n$ is 1], N - methyl-2,4,6-triiodo-3-propionamidohydrocinnamic acid [(1); $R^1$ is $CH_2CH_3$, $R^2$ is $CH_3$, $R^3$ is H, $n$ is 1], or N-methyl-3-acetamido-2,4,6-triiodo-α-butyl-hydrocinnamic acid [(1); $R^1$ is $CH_3$, $R^2$ is $CH_3$, $R^3$ is $CH_2CH_2CH_2CH_3$, $n$ is 1].

EXAMPLE 2

N - methyl - 3 - acetamido-2,4,6-triiodo-α-ethylhydrocinnamic acid [(1); $R^1$ is $CH_3$, $R^2$ is $CH_3$, $R^3$ is $CH_2CH_3$, $n$ is 1] was prepared from 40 g. of the sodium salt of 3-acetamido-2,4,6-triiodo-α-ethylhydrocinnamic acid, 15.5 g. of dimethyl sulfate and 61.2 ml. of 2.06 N aqueous sodium hydroxide according to the procedure described above in Example 1. The product was recrystallized from isopropyl alcohol to give N-methyl-3-acetamido-3,4,6-triiodo-α-ethylhydrocinnamic acid, M.P. 201.0–202.4° C. (corr.).

EXAMPLE 3

N - ethyl-3-butyramido-2,4,6-triiodo - α - ethylhydrocinnamic acid [(1); $R^1$ is $CH_2CH_2CH_3$, $R^2$ is $CH_2CH_3$, $R^3$ is $CH_2CH_3$, $n$ is 1] was prepared from 40 g. of 3-butyramido-2,4,6-triiodo-α-ethylhydrocinnamic acid, 18.6 g. of diethyl sulfate and 58.6 ml. of 2.06 N aqueous sodium hydroxide according to the procedure described above in Example 1. The product was recrystallized first from aqueous acetone and then twice from acetonitrile to give N-ethyl-3-butyramido - 2,4,6 - triiodo-α-ethylhydrocinnamic acid, M.P. 142.6–149.0° C. (corr.).

EXAMPLE 4

(a) 3 - acetamido-2,4,6-triiodo-α-phenylhydrocinnamic acid.—A mixture of 20.0 g. of 3-amino-2,4,6-triiodo-α-phenylhydrocinnamic acid, 9.90 g. of acetic anhydride, 92.0 ml. of acetic acid and 3 drops of sulfuric acid was heated at 65–75° C. for four and one-half hours. Water (20 ml.) was then added, and the reaction mixture was heated at 70° C. for 45 minutes, cooled and poured into water. The solid product was collected by filtration, giving 20.8 g. of 3-acetamido-2,4,6-triiodo-α-phenylhydrocinnamic acid, M.P. 244.5–246° C. (uncorr.).

By replacing the acetic acid in the foregoing preparation by a molar equivalent amount of formic acid there can be obtained 3-formamido - 2,4,6 - triiodo-α-phenylhydrocinnamic acid.

(b) N-methyl - 3 - acetamido-2,4,6-triiodo-α-phenylhydrocinnamic acid [(1); $R^1$ is $CH_3$, $R^2$ is $CH_3$, $R^3$ is $C_6H_5$, $n$ is 1] can be prepared by treating 3-acetamido-2,4,6-triiodo-α-phenylhydrocinnamic acid with dimethyl sulfate in aqueous sodium hydroxide solution according to the procedure described above in Example 1.

3-formamido-2,4,6-triiodo-α-phenylhydrocinnamic acid can similarly be N-methylated to give N-methyl-3-formamido - 2,4,6 - triiodo-α-phenylhydrocinnamic acid [(1); $R^1$ is H, $R^2$ is $CH_3$, $R^3$ is $C_6H_5$, $n$ is 1].

EXAMPLE 5

N - propyl - 3 - butyramido - 2,4,6 - triiodo - α - ethyl-hydrocinnamic acid [(1); $R^1$ is $CH_2CH_2CH_3$, $R^2$ is $CH_2CH_2CH_3$, $R^3$ is $CH_2CH_3$, $n$ is 1]

To a solution of 19.9 g. of 3-butyramido-2,4,6-triiodo-α-ethylhydrocinnamic acid in 100 ml. of water and 50 ml. of acetone was added 60 ml. of 1 N aqueous sodium hydroxide. There was then added a solution of 7.14 g. of n-propyl iodide in 30 ml. of acetone, dropwise over a period of 20 minutes with rapid stirring. Enough acetone was added to effect solution and the mixture was kept at room temperature overnight. The pH of the mixture was adjusted to 6.8–7.0 with 3 N hydrochloric acid (about 10 ml.) and the mixture was concentrated in vacuo. The residue was redissolved in 100 ml. of water, and the solution was filtered and acidified with dilute hydrochloric acid. The product was collected and recrystallized twice from isopropyl acetate to give N-propyl-3-butyramido-2,4,6-triiodo - α - ethylhydrocinnamic acid, M.P. 161.0–165.4° C. (corr.).

EXAMPLE 6

N-methyl - 3 - acetamido-2,4,6-triiodophenylacetic acid [(1); R¹ is CH₃, R² is CH₃, n is 0] was prepared from 27.9 g. of 3-acetamido-2,4,6-triiodophenylacetic acid (produced by iodination of m-aminophenylacetic acid to give 3-amino-2,4,6-triiodophenylacetic acid, M.P. 206–208° C., followed by acetylation with acetic anhydride) and 12.6 g. of dimethyl sulfate according to the procedure described above in Example 1. The N-methyl-3-acetamido-2,4,6-triiodophenylacetic acid thus obtained was converted to its sodium salt, obtained as a yellow powder melting above 300° C. when recrystallized from a methanol-ether mixture.

EXAMPLE 7

(a) 3,5-dinitro-α-phenylcinnamic acid

A solution of 60 g. (0.31 mole) of 3,5-dinitrobenzaldehyde and 45 g. (0.33 mole) of phenylacetic acid in 39 ml. (40.5 g., 0.40 mole) of acetic anhydride was prepared by warming on a steam bath. The stirred solution was cooled while 39 ml. (29.2 g., 0.29 mole) of triethylamine was added slowly. The solution was heated for 78 minutes on a steam bath and then poured into 500 ml. of water. The aqueous mixture was stirred with 140 ml. of 35% NaOH solution, filtered and acidified with 3 N HCl. The solid was collected by filtration and then triturated with 500 ml. of warm methanol. The solid was again collected and dried at 60° C. There was obtained 78 g. of orange solid, M.P. 228–233° C. This solid was dissolved in 3 l. of methanol and the solution concentrated to about 1.2 l. and cooled. The solid was collected and dried. There was obtained 54 g. of orange prisms, M.P. 238–240° C. Repeated recrystallization from methanol and treatment with activated charcoal gave pale orange prisms of trans-3,5-dinitro-α-phenylcinnamic acid, M.P. 241.6–242.6° C.; $\lambda_{max}$ 251 mμ (ε 27,000); $\lambda_{max}$ 3.25, 3.50, 3.84, 5.92, 6.18, 6.31, 6.47, 6.67, 6.91μ.

Additional solid was obtained by concentration of the methanol filtrate and was the triethylamine salt of cis-3,5-dinitro-α-phenylcinnamic acid. Several recrystallizations from ethyl acetate gave pale yellow prisms, M.P. 182–4° C. When the salt was dissolved in dilute NaOH and dilute HCl added to the solution, cis-3,5-dinitro-α-phenylcinnamic acid was precipitated and collected. Recrystallization from methanol gave pale yellow prisms, M.P. 221–222° C.; $\lambda_{max}$ 231 mμ (ε 22,000), 272 (21,000); $\lambda_{max}$ 3.25–3.65, 5.80, 6.20, 6.32, 6.54, 6.97μ.

By heating at 180° C. 3,5-dinitrobenzaldehyde with an excess of acetic anhydride and sodium acetate, or with an excess of caproic anhydride and sodium caproate there can be obtained, respectively, 3,5-dinitrocinnamic acid or 3,5-dinitro-α-butylcinnamic acid.

(b) 3,5-diamino-α-phenylhydrocinnamic acid

A mixture of 20.9 g. of 3,5-dinitro-α-phenylcinnamic acid (mixture of cis- and trans-isomers) and 5 teaspoonfuls of Raney nickel catalyst in 1400 ml. of methanol was hydrogenated at room temperature and 608 p.s.i. for one hour. The catalyst was filtered off and rinsed with ethanol, and the filtrate was concentrated to dryness in vacuo. The residue was leached with boiling water and the product allowed to crystallize from the water upon cooling. The solid product was separated and recrystallized from water to give 3,5-diamino-α-phenylhydrocinnamic acid, M.P. 170–172° C. (uncorr.). A sample of the free acid was converted to its dihydrochloride salt with concentrated hydrochloric acid. The salt had the M.P. 273.0–273.2° C. (dec., corr.).

By replacing the 3,5 - dinitro-α-phenylcinnamic acid in the foregoing preparation by a molar equivalent amount of 3,5-dinitrocinnamic acid or 3,5-dinitro-α-butylcinnamic acid there can be obtained, respectively, 3,5-diaminohydrocinnamic acid or 3,5-diamino-α-butylhydrocinnamic acid.

(c) 3,5-diamino-2,4,6-triiodo-α-phenylhydrocinnamic acid

To a stirred mixture of 19.8 g. of 3,5-diamino-α-phenylhydrocinnamic acid and 20 drops of concentrated hydrochloric acid in 1300 ml. of water was added 85 ml. of 2.36 N potassium iododichloride solution. The reaction mixture was stirred for 20 minutes and the solid product collected by filtration. The latter solid was dissolved in aqueous sodium hydroxide (greater than 10%), aqueous sodium chloride solution was added and the solid material which separated out was collected by filtration. The resulting sodium salt of 3,5-diamino-2,4,6-triiodo-α-phenylhydrocinnamic acid was dissolved in water and acidified with 6 N hydrochloric acid to give 3,5-diamino-2,4,6-triiodo-α-phenylhydrocinnamic acid, M.P. 209–213° C. (uncorr.).

By replacing the 3,5-diamino-α-phenylhydrocinnamic acid in the foregoing preparation by a molar equivalent amount of 3,5-diaminohydrocinnamic acid or 3,5-diamino-α-butylhydrocinnamic acid there can be obtained, respectively, 3,5-diamino-2,4,6-triiodohydrocinnamic acid or 3,5-diamino-2,4,6-triiodo-α-butylhydrocinnamic acid.

(d) 3,5-diacetamido-2,4,6-triiodo-α-phenylhydrocinnamic acid

A mixture of 12.85 g. of 3,5-diamino-2,4,6-triiodo-α-phenylhydrocinnamic acid, 25 ml. of acetic anhydride and 3 drops of concentrated sulfuric acid was heated for 5 minutes on a steam bath. The reaction mixture was cooled, the solid product collected by filtration, and the latter washed with hexane and water and then dried. The product was purified by dissolving it in excess dilute sodium hydroxide solution and reprecipitated it with hydrochloric acid. There was thus obtained 3,5-diacetamido-2,4,6 - triiodo-α-phenylhydrocinnamic acid, cream-colored solid, M.P. 295.0–295.6° C. (dec., corr.).

By replacing the 3,5-diamino-2,4,6-triiodo-α-phenylhydrocinnamic acid in the foregoing preparation by a molar equivalent amount of 3,5-diamino-2,4,6-triiodohydrocinnamic acid or 3,5-diamino-2,4,6-triiodo-α-butylhydrocinnamic acid there can be obtained, respectively, 3,5-diacetamido - 2,4,6-triiodohydrocinnamic acid or 3,5-diacetamido-2,4,6-triiodo-α-butylhydrocinnamic acid.

By replacing the acetic anhydride in the foregoing preparation by a molar equivalent amount of butyric anhydride there can be obtained 3,5-dibutyramido-2,4,6-triiodo-α-phenylhydrocinnamic acid.

3,5 - diformamido-2,4,6-triiodo-α-phenylhydrocinnamic acid can be prepared by treating 3,5-diamino-2,4,6-triiodo-α-phenylhydrocinnamic acid with a mixture of formic acid and acetic anhydride.

(e) N,N′ - dimethyl-3,5-diacetamido-2,4,6-triiodo-α-phenylhydrocinnamic acid [(3); R¹ is CH₃, R² is CH₃, R³ is C₆H₅, n is 1]

A solution of 3.05 ml. of dimethyl sulfate in 3 ml. of acetone was added to a solution of 10.75 g. of 3,5-diacetamido-2,4,6-triiodo-α-phenylhydrocinnamic acid in 37.15 ml. of 2.01 N sodium hydroxide cooled to below 10° C. The reaction mixture was stirred for one hour, the pH adjusted to 9 with 3 N hydrochloric acid, the mixture concentrated to remove the acetone, then cooled and filtered. The filtrate was acidified with 6 N hydrochloric acid, allowed to stand at room temperature overnight, and the solid product was collected by filtration to give N,N′-dimethyl-3,5-diacetamido - 2,4,6 - triiodo-α-phenylhydrocinnamic acid, M.P. 312–313° C. (uncorr., dec.).

By replacing the 3,5-diacetamido-2,4,6-triiodo-α-phenylhydrocinnamic acid in the foregoing preparation by a molar equivalent amount of 3,5-diacetamido-2,4,6-triiodocinnamic acid, 3,5-diacetamido-2,4,6-triiodo-α-butylhydrocinnamic acid, 3,5 - diformamido - 2,4,6 - triiodo-α-phenylhydrocinnamic acid or 3,5-dibutyramido-2,4,6-triiodo-α-phenylhydrocinnamic acid there can be obtained, respectively, N,N'-dimethyl-3,5-diacetamido-2,4,6-triiodohydrocinnamic acid [(3); $R^1$ is $CH_3$, $R^2$ is $CH_3$, $R^3$ is H, $n$ is 1], N,N'-dimethyl - 3,5 - diacetamido-2,4,6-triiodo-α-butylhydrocinnamic acid [(3); $R^1$ is $CH_3$, $R^2$ is $CH_3$, $R^3$ is $n$-$C_4H_9$, $n$ is 1], N,N'-dimethyl-3,5-diformamido-2,4,6-triiodo-α-phenylhydrocinnamic acid [(3); $R^1$ is H, $R^2$ is $CH_3$, $R^3$ is $C_6H_5$, $n$ is 1], or N,N'-dimethyl-3,5-dibutyramido - 2,4,6 - triiodo-α-phenylhydrocinnamic acid [(3); $R^1$ is $CH_2CH_2CH_3$, $R^2$ is $CH_3$, $R^3$ is $C_6H_5$, $n$ is 1].

EXAMPLE 8

(a) 3,5-diacetamido-2,4,6-triiodophenylacetic acid can be prepared by heating at 100° C. 3,5-diamino-2,4,6-triiodophenylacetic acid with an excess of acetic anhydride either in pyridine solution or in the presence of a catalytic amount of sulfuric acid.

(b) N,N'-dimethyl-3,5-diacetamido-2,4,6-triiodophenylacetic acid [(3); $R^1$ is $CH_3$, $R^2$ is $CH_3$, $n$ is 0] can be prepared by treating 3,5-diacetamido-2,4,6-triiodophenylacetic acid with dimethyl sulfate and aqueous sodium hydroxide according to the procedure described above in Example 1.

I claim:
1. A compound of the formula

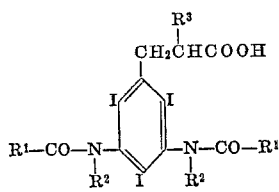

wherein $R^1$ and $R^2$ are each lower-alkyl, and $R^3$ is phenyl.

2. N,N' - dimethyl - 3,5 - diacetamido - 2,4,6 - triiodo-α-phenylhydrocinnamic acid.

3. A compound of the formula

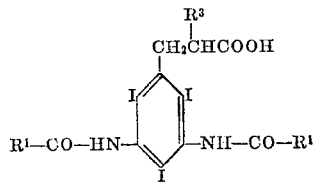

wherein $R^1$ is lower-alkyl, and $R^3$ is phenyl.

4. 3,5 - diacetamido - 2,4,6 - triiodo-α-phenylhydrocinnamic acid.

5. 3,5-dinitro-α-phenylcinnamic acid.

References Cited

UNITED STATES PATENTS

| | | | |
|---|---|---|---|
| 2,705,726 | 4/1955 | Archer | 260—518 |
| 2,840,602 | 6/1958 | Larsen | 260—518 |
| 2,895,988 | 7/1959 | Archer et al. | 260—518 |
| 3,178,473 | 4/1965 | Holtermann et al. | 260—518 |

OTHER REFERENCES

Chem. Abstracts, vol. 61, 9439h, citing Czech Patent 110,222, Mar. 15, 1964.

LORRAINE A. WEINBERGER, *Primary Examiner.*

M. G. BERGER, *Assistant Examiner.*

U.S. Cl. X.R.

260—501.16, 518, 999